Figure 1:
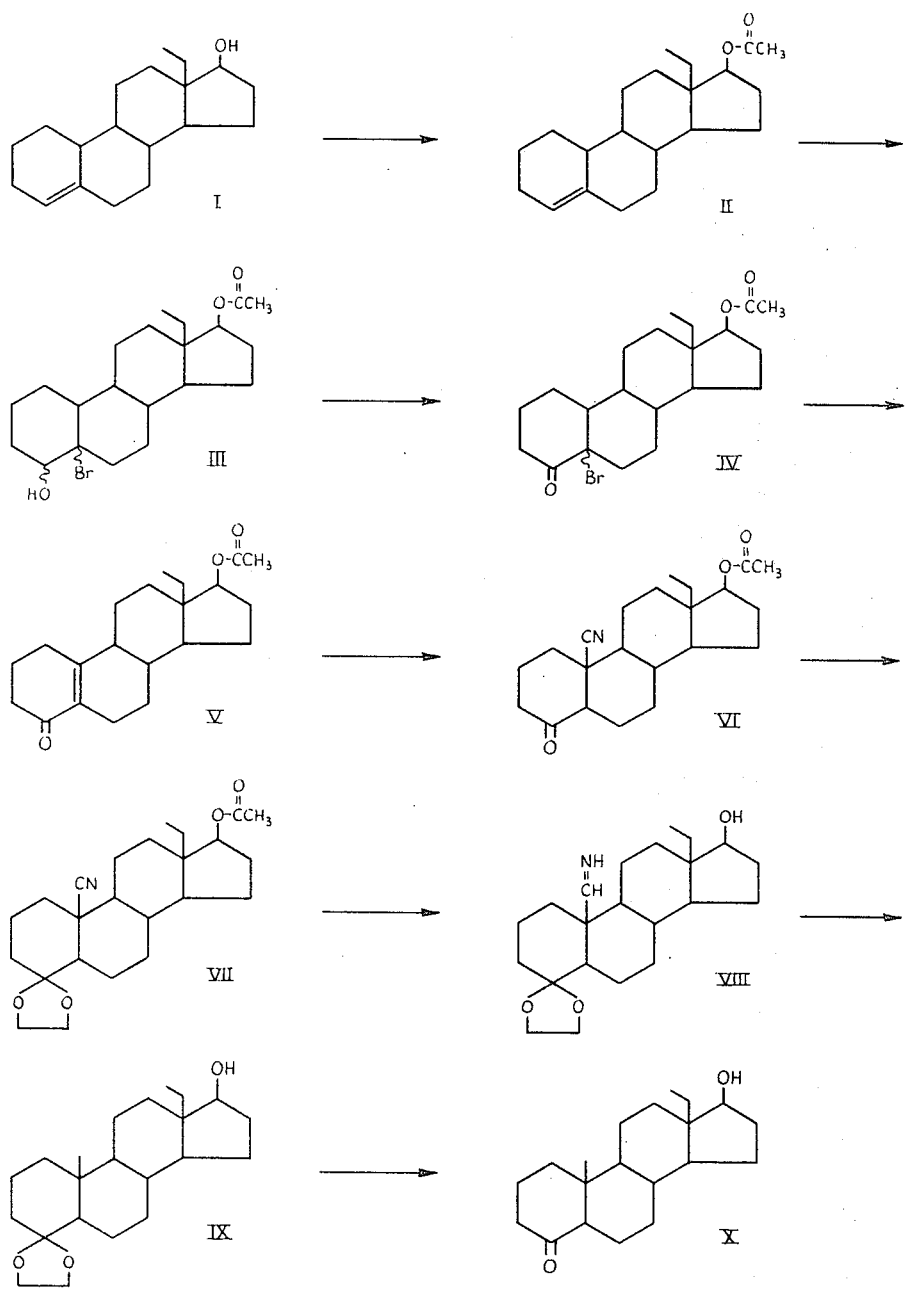

June 24, 1969  D. P. STRIKE ET AL  3,452,004
10β-METHYL-13-ALKYLGONAN-4-ONES
Filed May 19, 1966  Sheet 1 of 2

INVENTORS
DONALD P. STRIKE
DAVID R. HERBST
HERCHEL SMITH
BY Vito Victor Bellino
ATTORNEY United States Patent Office 3,452,004
Patented June 24, 1969

3,452,004
10β-METHYL-13-ALKYLGONAN-4-ONES
Donald P. Strike, Philadelphia, David R. Herbst, King of Prussia, and Herchel Smith, Wayne, Pa., assignors to American Home Products Corporation, New York, N.Y., a corporation of Delaware
Filed May 19, 1966, Ser. No. 551,391
Int. Cl. C07c *169/22, 169/10, 167/00*
U.S. Cl. 260—239.55
11 Claims

ABSTRACT OF THE DISCLOSURE 10-methyl-13-alkylgonan-4-ones possessing hormonal activity such as androgenic, anabolic, progestational and anti-androgenic activity and useful as intermediates for the preparation of steroids possessing hormonal effects are prepared from 13-alkyl-gon-4-enes by converting the latter to their corresponding 4-hydroxy-5-bromo derivative, oxidizing to the 4-keto-5-bromo derivative, dehydrobrominating across the 5(10) position, adding hydrogen cyanide at 5(10) to obtain the corresponding 4-keto-10-cyano derivative, ketalizing to protect the 4-keto group, reducing the 10-cyano group to the 10-imino group, converting the imine group to a 10-methyl group and hydrolyzing to remove the protecting ketal group.

This invention relates to compositions of matter classified in the art of chemistry as substituted gonan-4-ones.

The invention sought to be patented, in a principal composition aspect, is described as residing in the concept of a gonan-4-one having attached thereto a methyl group at the 10-position and a polycarbon alkyl group at the 13-position.

The tangible embodiments of the principal compositions of the invention possess the inherent general physical properties of being white crystalline solids, are substantially insoluble in water, are generally soluble in polar solvents, such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the 10-methyl and the 13-polycarbonalkyl groups are evident in the nuclear magnetic resonance spectrum. The aforementioned physical characteristics taken together with the elemental analysis, the nature of the starting materials and the mode of synthesis, further confirm the molecular structure hereinbefore set forth for the compositions sought to be patented.

The tangible embodiments of the principal compositions of the invention possess the inherent applied use characteristics of exerting qualitatively varying hormonal effects in animals as evidenced by pharmacological evaluation according to standard test procedures. Such tangible embodiments possess androgenic, anabolic, progestational, and antiandrogenic activity. In addition to their inherent applied use characteristic, the compositions of the invention possess the further applied use characteristic of being intermediates for making compositions which possess applied use characteristics of exerting qualitatively varying horomonal effects in animals as evidenced by pharmacological evaluation according to standard test procedures.

The invention sought to be patented in a principal process of making the composition aspect, is described as residing in the concept of a sequence of reactions including: converting a 17-hydroxy-13-alkylgon-4-ene whose 17-hydroxy group is protected to permit selective oxidation of the hereinafter formed 4-hydroxy group to the corresponding bromohydrin, i.e., the 4-hydroxy-5-bromo derivative, oxidizing the 4-hydroxy group to 4-keto group, dehydrobrominating to the corresponding conjugated 4-keto-5(10)-ene derivative, adding hydrocyanic acid across the 5(10)-unsaturation to obtain the 4-keto-10-cyano product, ketalizing to protect the 4-keto group, reducing the 10-cyano to the corresponding imine, converting the imine group to a 10-methyl group, and hydrolysing the 4-ketal to obtain the corresponding 17-hydroxy-10-methyl-13-alkylgonan-4-one.

The invention sought to be patented, in a second composition aspect, is described as residing in the concept of a 13-polycarbonalkyl-5-bromo-17-hydroxygonan - 4 - one acetate.

The tangible embodiments of the second composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet, infrared and nuclear magnetic resonance spectrographic analysis, spectral data confirming the molecular structure hereinbefore set forth. For example, the presence of the A-ring carbonyl group is evident in the infrared. The aforementioned physical characteristics, taken together with the elemental analysis, the nature of the starting materials, and the mode of synthesis further confirm the structure of the compositions sought to be patented.

The tangible embodiments of said second composition aspect possess the applied use characterstic of being intermediates for the preparation of compositions exerting hormonal effects as evidenced by standard test procedures.

The invention sought to be patented in a third composition aspect is described as residing in the concept of a 13-polycarbonalkyl-17-hydroxygon-5(10)-en-4-one.

The tangible embodiments of the third composition aspect of the invention possess the inherent general physical properties of being white crystalline solids, are substantially insoluble in water, are generally soluble in polar solvents, such as dimethylacetamide. Examination of the compounds produced according to the hereinafter described process reveals, upon infrared, ultraviolet, and nuclear magnetic resonance spectrographic analysis, spectral data confirming the molecular structure hereinbefore set forth. For example, the conjugated 5(10)-en-4-one conjugated system is evident in the ultraviolet. The aforementioned physical characteristics, taken together with the elemental analysis, the nature of the starting materials, and the mode of synthesis, further confirm the structure of the compositions sought to be patented.

The invention sought to be patented, in a fourth composition aspect, is described as residing in the concept of a 13 - polycarbonalkyl-10-cyano-17-hydroxygonan-4-one acetate.

The tangible embodiments of the fourth composition aspect of the invention possess the inherent general physical properties of being white crystalline solids, are substantially insoluble in water, are generally soluble in polar solvents, such as dimethylacetamide. Examination of the compounds produced according to the hereinafter described process reveals, upon infrared, ultraviolet and nuclear magnetic resonance spectrographic analysis, spectral data confirming the molecular structure hereinbefore set forth. For example, the 4-keto and the 10-cyano group are evident in the infrared. The aforementioned physical characteristics, taken together with the elemental analysis, the nature of the starting materials, and the mode of synthesis, further confirm the structure of the compositions sought to be patented.

The manner of making and using the invention will now be generally described so as to enable a person skilled in the art of chemistry to make and use the same, as follows.

In describing the invention, reference will be made to the annexed drawings, wherein:

FIG. 1 illustrates schematically the reaction sequence for preparing a gonan-4-one having attached thereto a methyl group at the 10-position and a polycarbonalkyl group at the 13-position, specifically 13-ethyl-17-hydroxy-10-methylgonan-4-one.

Figure 2:
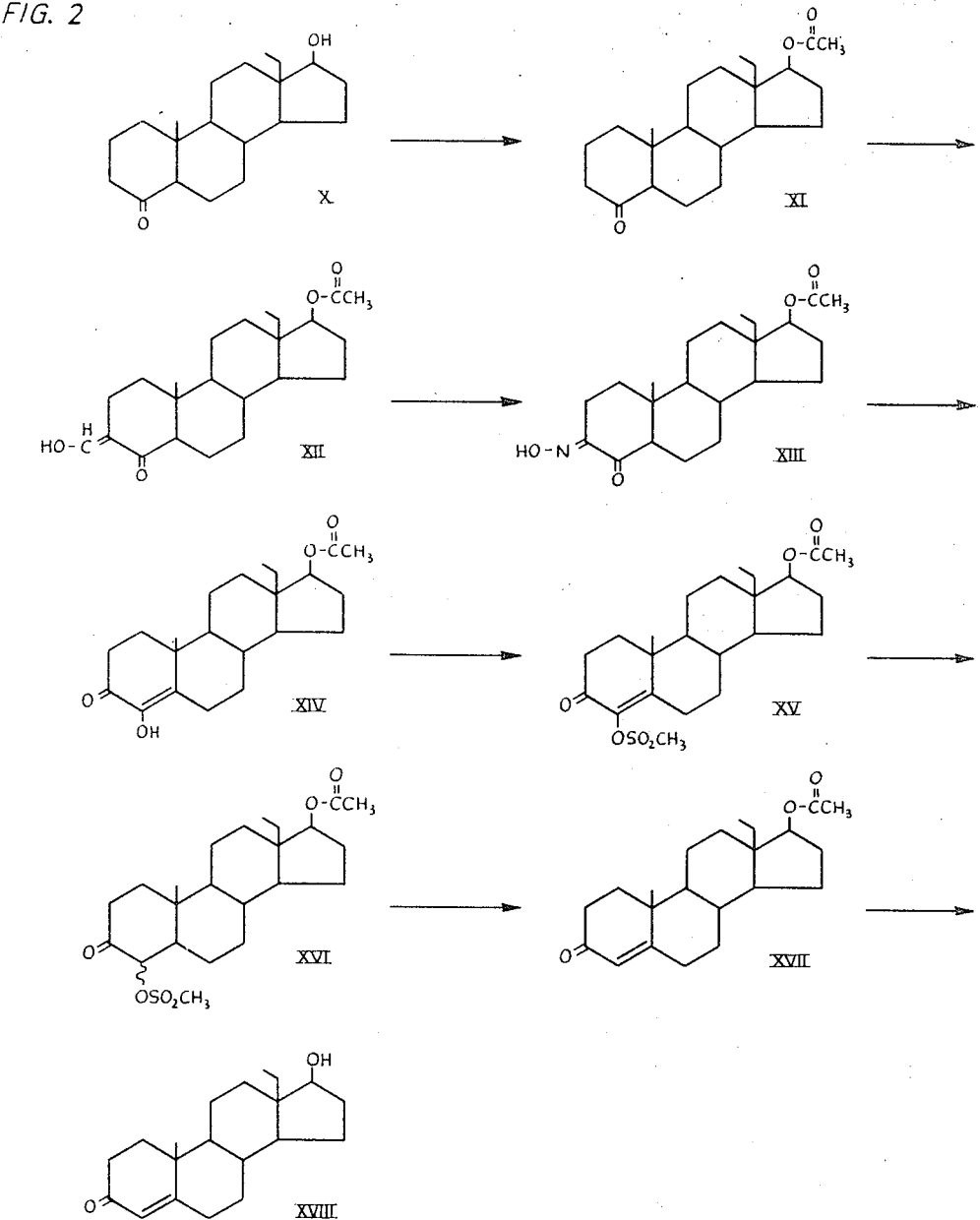

FIG. 2 illustrates schematically the reaction sequence for using a gonan-4-one as intermediates for making compositions possessing the applied use characteristic of exerting qualitatively varying hormonal effects in animals, specifically 13 - ethyl-17-hydroxy-10-methyl-gon-4-en-3-one.

Referring now to FIG. 1, wherein the compounds are assigned Roman numerals sequentially for identification, the starting materials for the process of the invention, i.e., 13-alkyl-17-hydroxygon-4-enes (I) are prepared as described in co-pending United States application Ser. No. 388,820 filed Aug. 11, 1964. Esterification of the 17-hydroxy group is accomplished preferably with acetic anhydride in pyridine as a solvent forming the acetate to protect the labile hydroxy in the hereinafter described oxidation steps of the process so as to permit selective oxidation of the hereinafter formed 4-hydroxy group. Protection of the 17-hydroxy groups may be achieved by forming other alkanoyl or aroyl esters or by other methods known to those skilled in the art of chemistry. The so-formed ester (II) is dissolved in a non-reacting polar solvent preferably dioxane and caused to react with N-bromosuccinimide and 70% perchloric acid to form the corresponding bromohydrin (III). In lieu of bromine, the corresponding chlorohydrin can be prepared using an analogous procedure. Oxidation with Jones reagent (8 N chromium trioxide in acetone aqueous sulfuric acid) converts the 4-hydroxy group to a 4-keto group (IV). Other mild oxidation procedures known to those skilled in the art, such as dimethylsulfoxide in acetic anhydride or chromium trioxide in pyridine, can be used in lieu of the Jones reagent to bring about the desired oxidation. Dehydrohalogenation of the 4-keto-5-halo compound produces the corresponding 5(10)-en-4-one derivative (V). While pyridine is the preferred dehydrohalogenating agent, any tertiary aryl base, such as the picolines or collidines, can be used. Furthermore, agents, such as dimethylaniline, potassium acetate in acetic acid and lithium chloride or bromide, with or without lithium carbonate, can also be used to bring about the desired dehydrohalogenation reaction. Treatment of the so-obtained 5(10)-en-4-one with hydrocyanic acid in tetrahydrofuran in the presence of 25% diethyl aluminum bromide in heptane adds hydrogen cyanide across the double bond to form the corresponding 10-cyano derivative (VI). To protect the 4-keto group in the hereinafter-to-be-described reduction step of the process, it is ketalized preferably with ethylene glycol in the presence of p-toluene-sulfonic acid, although other 1,2-glycols, or alcohols in the presence of the same or other acid catalysts, such as mineral acid, boron trifluoride, can be used forming the corresponding 4-ketal (VII). Reduction of the 10-cyano group with lithium aluminum hydride converts it to the corresponding imine and cleaves the 17-ester (VIII). Wolf-Kishner reduction with hydrazine hydrate produces the desired 10-methyl group (IX) and treatment with acid hydrolyses the protecting ketal group to form the product 17-hydroxy-10-methyl-13-alkylgonan-4-one (X).

Referring now to FIG. 2, wherein the compounds are also assigned Roman numerals sequentially for identification and which illustrates a method of using the compounds of the invention for the preparation of 17-hydroxy-10-methyl - 13-polycarbonalkylgon-4-en-3-ones (XVIII), the 17-hydroxy group of a 17-hydroxy-10-methyl-13-alkyl-gonan-4-one (X) is esterified preferably with acetic anhydride in the presence of pyridine to protect the labile 17-hydroxy group so as to permit selective mesylation of the later-formed 4-hydroxy group in the hereinafter described reactions. The 17-hydroxy group can also be protected by forming other alkanoyl or aroyl esters or by other methods known to those skilled in the art of chemistry. The so-formed ester (XI) is treated with ethyl formate in sodium methoxide to prepare the corresponding 3-hydroxymethylene (XII) derivative. Reaction with sodium nitrite in acetic acid-methylene dichloride converts the 3-hydroxymethylene derivative to the corresponding 3-oximino derivative (XIII). Hydrolysis of said 3-oximino derivative produces the corresponding 4-hydroxy-4-en-3-one (XIV). Mesylation of the 4-hydroxy group with methane sulfonyl chloride in pyridine (XV) followed by reduction of the 4-unsaturation with hydrogen in the presence of 10% palladized charcoal, and subsequent oxidation with Jones reagent yields XVI which on treatment with lithium chloride-lithium carbonate at 140° in dimethyl formamide affords the corresponding 13 - alkyl-17-hydroxy-10-methylgon-4-en-3-one, ester (XVII). On hydrolysis of the protecting 17-ester group, there are obtained 13-alkyl-17-hydroxy-10-methyl-gon-4-en-3-ones, having androgenic, anabolic, progestational and anti-androgenic activities.

The hereinbefore described processes of making and using offer a novel, unique and feasible wholly synthetic route to the corresponding natural steroids if the 13-alkyl group in the starting compound is methyl. Thus such valuable substances as testosterone and progesterone are made available by a totally synthetic route. Moreover, they offer a novel, unique and feasible route to compounds unobtainable from natural steroids, when the 13-alkyl group is polycarbonalkyl. The 13-polycarbonalkyl group can be of varying chain length, such as, for example, ethyl, propyl, isopropyl, butyl, isobutyl, pentyl, etc., even cetyl and for the process of the invention when such groups are present in the starting material, they will correspondingly be present in the intermediates and the final product and are full equivalents in the process as particularly described and claimed.

It will be apparent to those skilled in the art that the starting compounds can bear groups which are unaffected by the process reactions such as, for example, but not limited thereto, 6- or 7-methyl, or the starting compounds can bear other labile groups which can be protected to allow selective reaction, such as, for example, but not limited thereto, the 11-hydroxy or the 16-hydroxy group which can be protected by esterification in analogous fashion to the manner in which the 17-hydroxy group is protected in the description hereinabove, and these variations for the process of the invention, except for the limitations expressed above, are full equivalents of the process as particularly described.

It will also be apparent to one skilled in the art of chemistry that if the 17-position of the starting material is substituted only with hydrogen or with a group inert to the subsequent process reactions that protection of the 17-position to permit selective reaction is not required, and that when a starting material thus substituted is employed in the process of the invention, this variation is the full equivalent of the process as particularly described and claimed.

In any of the intermediate structures or the products of the hereinbefore described process, the 17-hydroxy group or its esters can be by methods known in the art converted to 17-carbonyl, and said 17-carbonyl group converted to alkylhydroxymethylene, for example, the 17α-methyl-17β-hydroxy or 17α-ethyl-17β-hydroxy derivative, by addition of the appropriate organo-metallic compound or to alkynylhydroxymethylene, for example, the 17α-ethynyl-17-hydroxy or 17α-chloroethynyl-17-hydroxy derivative, by addition of the appropriate alkali metal acetylene, or to alkenylhydroxymethylene, for example, the 17α-alkyl-17-hydroxy derivative, by partial reduction of the alkynyl-hydroxymethylene, all by known methods. The 17-carbonyl group may also be ketalized or thioketalized by treating with the appropriate alcohol or glycol in a suitable solvent under acidic conditions, as in the presence of an acid, such as sulfuric acid, p-toluenesulfonic acid, or boron trifluoride etherate, with heating where necessary according to the known art. It can also be converted to 17-acetyl, or the 17-corticoid type groups by previously described procedures.

The 17-hydroxy group can be converted to various acyloxy groups as hereinbefore described, or to alkoxy by etherification, all in the known manner.

While the tetracyclic compounds in this specification and the appended drawings are named either without regard to configuration, or to describe the configuration corresponding to that of the natural steroid, it is to be understood, the product of the given manipulation procedures is a racemic mixture which contains the compound corresponding to the natural steroid and its enantiomorph if the starting compound was a racemic mixture. However, if the starting compound is a particular enantiomorph, the final product also has the same enantiomorph configuration.

When employed in the applied use characteristic of exerting qualitatively varying hormonal effects, the products of the invention are administered in pharmaceutical forms known to those skilled in the art of pharmacy. Solid form preparation include powders, tablets, dispensable granules, capsules, cachets, and suppositories. A solid carrier can be one or more substances, which may also act as diluents, flavoring agents, solubilizers, lubricants, suspending agents, binders, or tablet disintegrating agents; it can also be an encapsulating material. In powders the carrier is a finely divided solid which is in admixture with the finely divided active compound. In the tablets, the compound is mixed with a carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tracanth, methyl cellulose, sodium carboxymethyl cellulose, low melting wax, and cocoa butter. Tablets, powders, cachets, and capsules can be used for oral administration and can be incorporated into formulation to obtain delayed or sustained release effects.

Liquid form preparations include solution, suspensions, and emulsions. The compounds are insoluble in water, but can be dissolved in aqueous organic-solvent mixtures that are non-toxic in the amounts used. As an example may be mentioned water-propylene glycol solutions for parenteral injection. Liquid preparations can also be formulated in solution, in aqueous polyethylene glycol. Aqueous suspensions suitable for oral use can be made by dispersing the finely divided compound in water with viscous materials, such as natural or synthetic gums, resins, etc., for example, gum arabic, ion-exchange resins, methylcellulose, sodium carboxymethylcellulose, and other well-known suspending agents.

The quantity of compound in a unit dosage form may be adjusted from less than 1 mg. to 100 mg. (generally within the range of 2.5 to 25 mg.) and the effective dosage depends upon the severity of the condition being treated, the stage, the individual case, and the compound, and will be determined by an attending physician. Generally, a dosage range of from 0.25 to about 15 mg. per kg. of body weight per day constitutes the over-all range.

The following examples illustrate the best mode contemplated by the inventors of carrying out the process of the invention and the manner of making and using as intermediates the compositions of the invention.

EXAMPLE 1 dl-13β-ethylgon-4-en-17β-ol, acetate

Keep a solution of 13.5 g. of dl-13β-ethylgon-4-en-17β-ol in 150 ml. of pyridine and 30 ml. of acetic anhydride at room temperature for 16 hours. Evaporate the solvents and crystallize the resulting solid residue from hexane to obtain 11.6 g. of crude product. Recrystallize twice from hexane to obtain the title product, M.P. 93–94°, $\lambda_{max.}^{KBr}$ 5.75 (s) (ester carbonyl), 8.03 (s) (ester C—O)μ

Found: C, 79.69; H, 10.31. $C_{21}H_{32}O_2$ requires: C, 79.70; H, 10.19.

Prepare in an analogous manner, the 13-methyl compound d-estr-4-en-17β-ol, acetate, M.P. 81–82°, $\lambda_{max.}^{KBr}$ 5.80, 8.00μ from d-estr-4-en-17β-ol.

EXAMPLE 2 dl-5ξ-bromo-13β-ethyl-17β-hydroxygonan-4-one, acetate

Treat a solution of 4.7 g. of dl-13β-ethylgon-4-en-17β-ol, acetate in 100 ml. of dioxane and 25 ml. of water with 3.4 g. of N-bromosuccinimide and a solution of 1.0 ml. of 70% perchloric acid in 5 ml. of water. Keep the mixture at room temperature for 1.25 hours, decolorize the orange solution with potassium bicarbonate, dilute with 200 ml. of water and extract four times with ether. Wash the ether extract with water, dry over sodium sulfate and evaporate to obtain 6.56 g. of crude bromohydrin, an oily solid.

Treat a stirred, cooled solution of the above bromohydrin (6.56 g.) in 100 ml. of acetone with Jones reagent (8 N chromium trioxide in aqueous sulfuric acid) until an orange color persists. Remove the cold water bath and stir the solution for 20 minutes. Destroy the excess Jones reagent with isopropyl alcohol, neutralize the solution with potassium bicarbonate, evaporate to a slurry, dilute with water and extract four times with ether. Wash the ether extract with water, dry over sodium sulfate and evaporate to yield 5.54 g. of a yellow, oily solid. Crystallize from acetone-hexane to obtain the title product, M.P. 137–138°, $\lambda_{max.}^{KBr}$ 5.77, 5.84, 8.01μ, $\lambda_{max.}^{95\% EtOH}$ 310 (ε 100) mμ

Found: C, 61.45; H, 7.37; Br, 19.0. $C_{21}H_{31}BrO_3$ requires: C, 61.31; H, 7.60; Br, 19.42.

Prepare in an analogous manner, the 13-methyl compound, d-5ξ-bromo-17β-hydroxyestran-4-one, acetate, M.P. 151–153°, $\lambda_{max.}^{KBr}$ 5.75, 5.87, 8.00μ from d-estr-4-en-17β-ol, acetate.

EXAMPLE 3 dl-13β-ethyl-17β-hydroxygon-5(10)-en-4-one, acetate

Reflux a solution of 27.0 g. of dl-5ξ-bromo-13β-ethyl-17β-hydroxygonan-4-one, acetate in 150 ml. of pyridine for 1 hr., dilute with water and extract with ether. After washing with 2 N hydrochloric acid, dry the extract and evaporate to yield a yellow solid. Dissolve the solid in benzene and rapidly chromatograph on a short neutral alumina (activity 3) column giving 20.2 g. of crude product. Recrystallize from acetone-hexane to obtain the title product, M.P. 143–144°, $\lambda_{max.}^{KBr}$ 5.75, 6.00, 8.05μ, $\lambda_{max.}^{95\% EtOH}$ 251 (ε 13,600) mμ

NMR: 2.07, 4.84 p.p.m. Found: C, 76.08; H, 9.01. $C_{21}H_{30}O_3$ requires: C, 76.32; H, 9.15.

Prepare in an analogous manner, the 13-methyl compound, d-17β-hydroxyestr-5(10)-en-4-one, acetate, M.P. 140.5–142°, $\lambda_{max.}^{KBr}$ 5.75, 6.05, 6.17, 8.05μ, $\lambda_{max.}^{95\% EtOH}$ 251 mμ (ε 13,000)

from d-5ξ-bromo-17β-hydroxyestran-4-one, acetate.

EXAMPLE 4 dl-10β-cyano-13β-ethyl-17β-hydroxy-5α-gonan-4-one, acetate

Add a solution of 2.7 ml. of hydrocyanic acid in 50 ml. of cooled tetrahydrofuran slowly to a stirring ice-cold mixture of 82.0 ml. of 25% diethyl aluminum bromide in heptane and 80 ml. of tetrahydrofuran under nitrogen. Add a solution of 7.9 g. of dl-13β-ethyl-17β-hydroxygon-5(10)-en-4-one, acetate in 75 ml. of tetrahydrofuran to the above mixture, remove the ice bath, discontinue the nitrogen and stopper the flask lightly. Keep the mixture at room temperature for 5 hours, and then add slowly to 1 liter of stirring ice cold 5% sodium hydroxide and extract with chloroform. Wash the extract with water, dry over sodium sulfate and evaporate to obtain 8.82 g. of pale yellow solid. Run a benzene solution of the crude product through a short neutral alumina (activity III) column and crystallize the resulting solid from hexane-acetone to obtain the title product, M.P. 183–185°, $\lambda_{max.}^{KBr}$ 4.50, 5.80, 8.00μ

Found: C, 74.08; H, 8.42; N, 3.88. $C_{22}H_{31}O_3$ requires: C, 73.91; H, 8.74; N, 3.92.

Prepare in an analogous manner, the 13-methyl compound, d-10β-cyano-17β-hydroxy-5α-estran-4-one, acetate, M.P. 201–203°, $\lambda_{max.}^{KBr}$ 4.50, 5.80, 8.10μ from d-17β-hydroxyestr-5(10)-en-4-one, acetate.

EXAMPLE 5 dl-13β-ethyl-17β-hydroxy-10β-methyl-5α-gonan-4-one

Reflux a solution of 5.0 g. of dl-10β-cyano-13β-ethyl-17β-hydroxy-5α-gonan-4-one, acetate, 200 mg. of p-toluenesulfonic acid and 25 ml. of ethylene glycol in 250 ml. of benzene for 16 hours with a Dean-Stark water separator. Evaporate the benzene, dilute the residue with water and extract into chloroform. Wash the extract with water, dry and evaporate to obtain 6.0 g. of white, solid ketal.

Add a solution of the above 6.0 g. of ketal in 200 ml. of tetrahydrofuran dropwise, over 15 minutes, to a stirring ice-cooled mixture of 6.0 g. of lithium aluminum hydride in 400 ml. of tetrahydrofuran under nitrogen. Reflux the mixture for 18 hours, cool in ice and decompose cautiously by adding a mixture of 100 ml. of 0.86 M potassium sodium tartrate and 25 ml. of 0.5 M tartaric acid. Dilute the mixture with water and extract with chloroform. Wash the extract with water, dry and evaporate to obtain 6.0 g. of white imine.

Stir and heat a solution of the above 6.0 g. of imine, 30 g. of potassium hydroxide and 30 ml. of hydrazine hydrate in 420 ml. of diethyleneglycol at a reaction temperature of 140–150° for 2 hours. Remove the condenser, heat the reaction until the temperature attains 210°, replace the condenser and reflux the mixture for 6 hours. Dilute the cooled solution with water, extract with chloroform and wash the extract with water, dry and evaporate to obtain 4.3 g. of solid methyl-ketal.

Reflux a solution of the above 4.3 g. of methyl-ketal in 200 ml. of acetone and 10 ml. of concentrated hydrochloric acid for 15 minutes, evaporate and dilute with water. Extract the mixture with chloroform and wash with water, dry, evaporate and chromatograph on neutral alumina (Act. 3). Elute with benzene and recrystallize from acetone-hexane to obtain the title product, M.P. 182–184°, $\lambda_{max.}^{KBr}$ 2.90, 5.92μ

NMR: 0.75, 1.88, 3.74 (triplet) p.p.m. Found: C, 78.75, H, 10.47. $C_{20}H_{32}O_2$ requires: C, 78.89; H, 10.59.

Prepare in an analogous manner, the 13-methyl compound d-17β-hydroxy-5α-androstan-4-one (reported in Helv. Chim. Acta 46, 352–64 [1963] and CA 58, 14051g) from d-10β-cyano-17β-hydroxy-5α-estran-4-one, acetate.

EXAMPLE 6 d-17β-acetoxy-5α-androstan-4-one

Heat d-17β-hydroxy-5α-androstan-4-one (0.97 g.) on a steam bath for 1 hour in acetic anhydride (5 ml.)-pyridine (15 ml.) to obtain the title product as a yellow solid.

EXAMPLE 7 dl-17β-acetoxy-13β-ethyl-10β-methylgonan-4-one

Treat dl-13β-ethyl-17β-hydroxy-10β-methylgonan-4-one by the method of Example 6 to obtain the title product, M.P. 174–176°, $\lambda_{max.}^{KBr}$ 5.74, 5.84, 8.10μ

EXAMPLE 8 d-17β-acetoxy-3-hydroxymethylene-5α-androstan-4-one

Keep the product of Example 6 (1.1 g.) for 2 days in ether (50 ml.)-ethyl formate (10 ml.) containing sodium methoxide (2 g.). Add water, separate the aqueous layer and wash it with ether, acidify with hydrochloric acid, and extract with chloroform. Wash the chloroform solution with water, dry and evaporate to obtain the title product (0.96 g.), $\lambda_{max}$ 279 mμ.

EXAMPLE 9 dl-17β-acetoxy-13β-ethyl-3-hydroxymethylene-10β-methylgonan-4-one

Treat the product of Example 7 by the method of Example 8 to obtain the title product, $\lambda_{max}$ 281 mμ.

EXAMPLE 10 d-17β-acetoxy-3-oximino-5α-androstan-4-one

Add sodium nitrite (0.36 g.) in water (5 ml.) with stirring to the product of Example 8 (0.96 g.) in acetic acid (60 ml.)-methylene dichloride (12 ml.)-water (3 ml.) at 0°. Stir for 45 minutes, dilute the mixture with methylene dichloride, wash with water until neutral, dry and evaporate to give the title product (0.90 g.), $\lambda_{max}$ 240 mμ.

EXAMPLE 11 dl-17β-acetoxy-13β-ethyl-10β-methyl-3-oximinogonan-4-one

Treat the product of Example 9 by the method of Example 10 to obtain the title product, $\lambda_{max.}^{EtOH}$ 235 mμ

EXAMPLE 12 d-4-hydroxytestosterone-17-acetate

Reflux the product of Example 10 (0.9 g.) for 10 hours in acetic acid (35 ml.)-water (15 ml.)-pyruvic acid (5 ml). Concentrate the reaction mixture, dilute wtih chloroform, wash successively with 5% aqueous potassium bicarbonate and water, dry and evaporate. Chromatograph the residue on silica gel and crystallize from acetone-hexane to obtain the title product, M.P. 187–189°, undepressed by an authentic sample, M.P. 188–190°, prepared by the method of B. Camerino et al., [J. Am. Chem. Soc., 78, 3540 (1956)], $[\alpha]_D$ +82.4° (chloroform), $\lambda_{max.}^{EtOH}$ 281 mμ (ε 12,000); $\lambda_{max.}^{KBr}$ 3.0, 575, 6.0, 6.1 and 8.0μ

NMR: 0.83, 1.17, 2.04, 4.64 (triplet) 2.84 p.p.m. Found: C, 73.28; H, 8.37. $C_{21}H_{30}O_4$ requires: C, 72.80; H, 8.73.

EXAMPLE 13 dl-13β-ethyl-4,17β-dihydroxy-10β-methylgon-4-en-3-one, 17-acetate

Treat the product of Example 11 by the method of Example 12 to obtain the title product, M.P. 184–186°;

$\lambda_{max.}^{KBr}$ 2.95, 5.75, 6.0, 6.10, 8.05μ, $\lambda_{max.}^{EtOH}$ 275 mμ (ε 12,600)

NMR: 1.17, 2.03, 3.87 (triplet), 6.18 p.p.m. Found: C, 73.22; H, 8.89. $C_{22}H_{32}O_4$ requires: C, 73.30; H, 8.95.

EXAMPLE 14 d-4,17β-dihydroxyandrost-4-en-3-one, 17-acetate, 4-methanesulfonate

Keep d-4,17β-dihydroxyandrost-4-en-3-one, 17-acetate (5 g.) at 0° with methanesulfonyl chloride (5 ml.) in pyridine (100 ml.) for 16 hrs. Add the mixture to ice water (1 l.) and filter the precipitate. Treat the precipitate with Norit in acetone and recrystallize from acetone-hexane to obtain the title product (4.2 g.), M.P. 185–187°, $\lambda_{max.}^{EtOH}$ 248 m$\mu$ ($\epsilon$ 14,900); $\lambda_{max.}^{KBr}$ 5.78, 5.93, 6.20, 7.40 8.03 and 8.50$\mu$ NMR: 0.83, 1.26, 2.03, 3.37, 4.65 (triplet) p.p.m.
*Analysis.*—Calcd. for $C_{22}H_{32}O_6S$: C, 62.24; H, 7.60; S, 7.6. Found: C, 62,53; H, 7.47; S, 7.7.

EXAMPLE 15 dl-13$\beta$-ethyl-4,17$\beta$-dihydroxy-10$\beta$-methylgon-4-en-3-one, 17-acetate, 4-methanesulfonate Treat dl-13$\beta$-ethyl-4,17$\beta$-dihydroxy-10$\beta$-methylgon-4-en-3-one, 17-acetate, by the manipulative procedure of Example 14 to obtain the title product, M.P. 211–213°, $\lambda_{max.}^{KBr}$ 5.75, 5.95, 6.18, 7.40, 8.05, 8.50$\mu$, $\lambda_{max.}^{EtOH}$ 243 m$\mu$ ($\epsilon$ 14,000)

NMR: 1.26, 2.04, 3.37, 4.67 (triplet) p.p.m. Found: C, 63.01; H, 7.88; S, 7.2. $C_{23}H_{34}O_6S$ requires: C, 62.98; H, 7.81; S, 7.31.

EXAMPLE 16 d-4$\xi$-17$\beta$-dihydroxy-5$\xi$-androstan-3-one, 17-acetate, 4-methanesulfonate Shake the product of Example 14 (1.0 g.) at atmospheric pressure under hydrogen in ethyl acetate (40 ml.)-sulfuric acid (1 ml.) containing 10% palladised charcoal (0.2 g.). After 1.4 moles of gas has been absorbed (35 min.), filter the mixture and wash the filtrate successively with 5% aqueous $KHCO_3$ and water, dry and evaporate. Dissolve the residual solid in acetone (60 ml.) and add 8 N chromic acid in aqueous sulfuric acid (A. Bowers, T. G. Halsall, E. R. H. Jones, and A. J. Lemin, J. Chem. Soc., 1953, 2555) dropwise with stirring until a red color persists. Stir for a further 30 min., discharge the red color with isopropyl alcohol, concentrate the mixture to 15 ml., dilute with water, and extract with chloroform. Evaporate the washed and dried extracts and crystallize the residue from acetone-n-hexane to obtain the title product (0.55 g.). The analytical sample has M.P. 174–175° (decomposition), $\lambda_{max.}^{KBr}$ 5.74, 7.40, 8.05 and 8.53$\mu$

*Analysis.*—Calcd. for $C_{22}H_{34}O_6S$: C, 61.9; H, 8.0; S, 7.5. Found: C, 62.0; H, 8.0; S, 7.8.

EXAMPLE 17 dl-13$\beta$-ethyl-4$\xi$,17$\beta$-dihydroxy-10$\beta$-methyl-5$\xi$-gonan-3-one, 17-acetate-4-methanesulphonate Treat the product of Example 15 by the manipulative procedure of Example 16 to obtain the title product, M.P. 187–188° (dec.);

$\lambda_{max.}^{KBr}$ 5.80, 7.42, 8.0, 8.50$\mu$

Found: C, 62.82; H, 8.27; S, 7.3. $C_{23}H_{36}O_6S$ requires: C, 62.70; H, 8.24; S; 7.28.

EXAMPLE 18 d-Testosterone acetate

Stir and heat the product of Example 16 (0.54 g.) under nitrogen for 4 hrs. with lithium chloride (2 g.) and lithium carbonate (1.2 g.) in dimethylformamide (75 ml.) at 140°. Evaporate the solvent and percolate the residue in benzene through a short column of alumina (activity 3). Crystallize the product from acetone-hexane, treat with Norit in acetone and recrystallize from acetone-hexane to give the title product; M.P. 137–139°, undepressed on admixture with authentic testosterone acetate and having an identical NMR spectrum, $\lambda_{max.}^{EtOH}$ 241 m$\mu$ ($\epsilon$ 16,000), $\lambda_{max.}^{KBr}$ 5.75, 6.0, 6.20, and 8.0$\mu$

*Analysis.*—Calcd. for $C_{21}H_{30}O_3$: C, 76.3; H, 9.15. Found: C, 76.2; H, 9.2.

EXAMPLE 19 dl-13$\beta$-ethyl-17$\beta$-hydroxy-10$\beta$-methylgon-4-en-3-one, 17-acetate

Treat the product of Example 17 by the manipulative procedure of Example 18 to obtain the title product, M.P. 159–160°, $\lambda_{max.}^{KBr}$ 5.75, 5.98, 6.20, 8.10$\mu$, $\lambda_{max.}^{EtOH}$ 238 m$\mu$ ($\epsilon$ 15,700)
NMR: 1.18, 2.02, 4.67 (triplet), 5.72 p.p.m. Found: C, 76.75; H, 9.08. $C_{22}H_{32}O_3$ requires: C, 76.70; H, 9.36.

EXAMPLE 20 dl-13$\beta$-ethyl-17$\beta$-hydroxy-10$\beta$-methylgon-4-en-3-one

Reflux a mixture of 2.1 g. of dl-13$\beta$-ethyl-17$\beta$-hydroxy-10$\beta$-methylgon-4-en-3-one, acetate, 2.0 g. of potassium hydroxide, 10 ml. of water and 100 ml. of methanol under nitrogen for 1 hour. Concentrate the mixture to a slurry, dilute with chloroform, wash with water and dry over sodium sulfate. Evaporate the chloroform solution and crystallize the residue from acetone to obtain 1.0 g. of the title product, M.P. 198–200°, $\lambda_{max.}^{KBr}$ 3.0, 6.00, 6.20$\mu$, $\lambda_{max.}^{EtOH}$ 240 m$\mu$ ($\epsilon$ 15,600)
NMR: 1.03 (triplet), 1.20, 1.90, 3.75 (triplet), 5.74 p.p.m. Found: C, 79.23; H, 9.93. $C_{20}H_{30}O_2$ requires: C, 79.42; H, 10.00.

EXAMPLE 21 dl-13$\beta$-ethyl-3,3-ethylenedioxy-10$\beta$-methylgon-5-en-17-one

Reflux a mixture of 0.35 g. of dl-13$\beta$-ethyl-17$\beta$-hydroxy-10$\beta$-methylgon-4-en-3-one, 20 mg. of p-toluenesulfonic acid, 4 ml. of ethylene glycol and 40 ml. of benzene with a Dean-Stark water separator for 18 hours. Dilute the mixture with ether, wash with water, dry and evaporate to obtain 0.50 g. of dl-13$\beta$-ethyl-3,3-ethylenedioxy-10$\beta$-methylgon-5-en-17$\beta$-ol.

Reflux the above 0.50 g. of 3-ketal in 85 ml. of benzene and 25 ml. of methyl ethyl ketone under nitrogen for ½ hour with a Dean-Stark water separator after removing the first 20 ml. of benzene distillate. Add a solution of 0.5 g. of aluminum isopropoxide in 15 ml of benzene and reflux the mixture under nitrogen for 4 hours. Dilute the mixture with ether, wash with water, dry and evaporate. Chromatograph the resulting residue on neutral alumina (act. 3) and elute with benzene to obtain 0.26 g. of the title product, M.P. 162–166°, $\lambda_{max.}^{KBr}$ 5.75$\mu$

EXAMPLE 22 dl - 13$\beta$ - 3,3 - ethylenedioxy - 17$\alpha$ - ethynyl - 17$\beta$ - hydroxy-10$\beta$-methylgon-5-ene Bubble acetylene through a stirred solution of 1.0 of dl - 13$\beta$ - ethyl-3,3-ethylenedioxy-10$\beta$-methylgon-5-en-17-one in 35 ml. of dimethylacetamide at room temperature for ¾ hour. Add 0.7 of lithium acetylide-ethylenediamine complex and stir at room temperature for 2½ hours. Add the solution slowly to ice-water mixture and extract with ether. Wash the ether extract with water, dry and evaporate to obtain 1.0 g. of the title product, a solid whose infrared spectrum is devoid of ketone absorption.

EXAMPLE 23 dl-13β-ethyl-17α-ethynyl-17β-hydroxy-10β-methylgon-4-en-3-one

Keep a solution of 1.0 of dl-13β-ethyl-3,3-ethylenedioxy - 17α - ethynyl - 17β - hydroxyl - 10β - methylgon-5-ene in 30 ml. of tetrahydrofuran and 6 ml. of 3 M perchloric acid at room temperature for 2 hours. Basify the solution with 5% potassium bicarbonate, concentrate under vacuum and add water. Extract the mixture with chloroform, wash the extract with water, dry and evaporate. Chromatograph the residue on neutral alumina (act. 3), elute with 1:19 ether-benzene and crystallize from acetone-hexane to obtain 0.31 g. of the title product, M.P. 205–207°, $\lambda_{max.}^{KBr}$ 3.03, 3.08, 6.05, 6.22μ, $\lambda_{max.}^{EtOH}$ 240 mμ (ε 16,000)

NMR: 1.02 (triplet), 1.18, 2.27, 2.58, 5.57 p.p.m. Found: C, 80.94; H, 9.11. $C_{22}H_{30}O_2$ requires: C, 80.93; H, 9.26.

EXAMPLE 24 dl - 13β,17α - diethyl - 17β - hydroxy - 10β - methylgon-4-en-3-one

Add a solution of 1.2 g. of dl-13β-ethyl-3,3-ethylenedioxy - 17α - ethynyl - 17β - hydroxy - 10β - methylgon-5-ene in 50 ml. of ethyl acetate and 25 ml. of benzene to 0.6 g. of 2% palladium oxide-strontium carbonate catalyst prehydrogenated in 20 ml. of ethyl acetate and 20 ml. of benzene and hydrogenate at room temperature and atmospheric pressure. After 2½ hours and an uptake of 2.2 moles of hydrogen, filter the mixture and evaporate the filtrate to obtain 1.0 g. of oily dl-13β,17α-diethyl - 3,3 - ethylenedioxy - 17β - hydroxy - 10β - methylgon-5-ene.

Keep a solution of the above 1.0 g. of 17α-ethyl-3-ketal compound in 40 ml. of tetrahydrofuran and 9 ml. of 3M perchloric acid at room temperature for 2 hours. Basify the solution with 5% potassium bicarbonate, concentrate under vacuum and add water. Extract the mixture with chloroform, wash the extract with water, dry and evaporate. Chromatograph the residue on neutral alumina (act. 3), elute with benzene and crystallize from acetone-hexane to obtain the title product (0.47 g.), M.P. 132–133°, $\lambda_{max.}^{KBr}$ 2.95, 6.03, 618μ, $\lambda_{max.}^{EtOH}$ 241 mμ (ε 16,000)

NMR: 1.20, 5.74 p.p.m. Found: C, 79.67; H, 10.14. $C_{22}H_{34}O_2$ requires: C, 79.95; H, 10.37.

EXAMPLE 25

17β-acetoxy-13β-ethyl-3,3-ethylenedioxy-17α-ethynyl-10β-methylgon-5-ene

Reflux 13β - ethyl - 3,3 - ethylenedioxy - 17α - ethynyl-17β-hydroxy-10β-methylgon-5-ene (3 g.) with acetic anhydride (48 ml.)-acetyl chloride (24 ml.)-pyridine (2.4 ml.) for 2 hrs. Evaporate the mixture to dryness under reduced pressure and partition the residue between benzene-ether and water. Wash, dry and evaporate the organic layer to obtain the title product.

EXAMPLE 26

17α - acetyl - 17β - acetoxy - 13β - 3,3 - ethylenedioxy-10β-methylgon-5-ene

Stir Dowex 50 ion exchange resin (400 ml.; acid form) for 30 min. with water (16 l.)-concentrated sulfuric acid (43 ml.). Decant off the liquid, wash the resin with water until free of sulfate ion, then add it to mercuric acetate (5 g.) in water (1.66 l.). Stir the mixture for 10 min., pour off the liquid and wash the residue with water until free of mercuric ion. Reflux an aliquot of this resin (500 ml.) ethylene glycol (50 ml.) containing toluene 17α-ethynyl-10β-methylgon-5-ene (10 g.) in ethanol (300 ml.) for 6 hr. Filter the cooled mixture, dilute the filtrate with methylene dichloride (2.5 l.) and wash the resulting solution with water and evaporate it under reduced pressure. If the residue shows appreciable infrared absorption in the 6.0μ region, reflux it for 5 hrs. in benzene (500 ml.)-ethylene glycol (50 ml.) containing toluene p-sulfonic acid (1 g.) using a Dean-Stark reflux head for continual removal of water. Wash the cooled mixture with water, dry, and evaporate to dryness under reduced pressure. Chromatograph this product or that obtained directly from the initial hydration reaction on deactivated alumina eluting with benzene and mixtures of benzene and ether to obtain the title product.

EXAMPLE 27

13β-ethyl-3,3-ethylenedioxy-17β-1′-hydroxyethyl-10β-methylgon-5-ene

Add 17α - acetyl - 17β-acetoxy-13β-ethyl-3,3-ethylenedioxy-10β-methylgon-5-ene (2.4 g.) in tetrahydrofuran (100 ml.) to a stirred solution of lithium (1 g.) in liquid ammonia (100 ml.). After 30 min. add methanol (80 ml.) followed by lithium (0.5 g.) in small pieces with further stirring. After a further 10 min. add water, and extract the mixture with ether. Evaporate the washed and dried ethereal solution to obtain the title product.

EXAMPLE 28

17β-acetyl-13β-ethyl-3,3-ethylenedioxy-10β-methylgon-5-ene

To pyridine (85 ml.) at 10–15° add chromium trioxide (8.82 g.) over 10 min. with stirring and after a further 15 min. add 13β-ethyl-3,3-ethylenedioxy-17β-1′-hydroxyethyl-10β-methylgon-5-ene (9.7 g.) in pyridine (100 ml.) with stirring. Allow the reaction mixture to warm to 25° and after stirring for a further 3 hrs. pour into icewater (1 l.) and extract with ether. Evaporate the washed and dried extracts removing the last traces of pyridine with azeotropic distillation with toluene to obtain the title product.

EXAMPLE 29

17β-acetyl-13β-ethyl-10β-methylgon-4-en-3-one

Keep 17β - acetyl - 13β - ethyl - 3,3-ethylenedioxy-10β-methylgon-5-ene (1 g.) for 1½ hours at 25° in acetone (100 ml.) containing p-toluenesulfonic acid monohydrate (150 mg.). Add aqueous sodium bicarbonate solution, extract the product with ether and purify it by chromatography on deactivated alumina. Elute with mixtures of hexane-benzene, pure benzene, and mixtures of benzene-ether to obtain the title product.

EXAMPLE 30

17β-2′-acetoxyacetyl-13β-ethyl-10β-methylgon-4-en-3-one

Stir 17β-acetyl - 13β - ethyl-10β-methylgon-4-en-3-one (3.91 g.) for 4 hrs. at room temperature with lead tetraacetate (6.52 g.) in benzene (190 ml.-methanol (10 ml.) containing boron trifluoride-ether complex (25 ml.). Isolate the product with chloroform and purify by chromatography on deactivated alumina. Elute with mixtures of pentane-benzene and pure benzene to obtain the title product.

EXAMPLE 31

17β-2′-acetoxyacetyl-13β-ethyl-3,3-ethylenedioxy-10β-methylgon-5-ene

Stir 17β-acetyl-13β-ethyl-3,3-ethylenedioxy-10β-methylgon-5-ene (3.53 g.) for 4 hrs. at room temperature with lead tetra-acetate (6.52 g) in benzene (190 ml.)-methanol (10 ml.) containing boron trifluoride-ether complex (25 ml.). Isolate the product with chloroform and purify by chromatography on alumina. Elute with mixtures of pentane-benzene and pure benzene to obtain the title product.

EXAMPLE 32

17β-2'-acetoxyacetyl-13β-ethyl-10β-methylgon-4-en-3-one

Keep 17β-2'-acetoxyacetyl-13β-ethyl-3,3-ethylenedioxy-10β-methylgon-5-ene (2 g.) for 2 hrs. at room temperature in acetone (100 ml.) containing p-toluenesulfonic acid monohydrate (150 mg.). Add sodium bicarbonate solution, extract the product with ether and chromatograph it on deactivated alumina. Elute with mixtures of hexane-benzene and pure benzene to obtain the title product.

EXAMPLE 33

13β,17-diethyl-3,3-ethylenedioxy-10β-methylgon-5,17(20)-diene

Add 20 ml. of phosphorus oxychloride dropwise over 2 hours to a stirring solution of 10 g. 13β,17α-diethyl-3,3-ethylenedioxy-17β-hydroxy-10β-methylgon-5-ene in 50 ml. of pyridine and reflux the mixture for 2 hours. Pour the cooled reaction mixture into ice water, extract with ether, wash the extract with water, dry and evaporate. Chromatograph the residue on deactivated alumina and elute with hexane-benzene mixtures to obtain the title product.

EXAMPLE 34

13β,17-diethyl-10β-methylgon-4,17(20)-dien-3-one

Keep a solution of 2.0 g. of 13β,17-diethyl-3,3-ethylenedioxy - 10β - methylgon - 5,17(20 - diene and 0.3 g. of p-toluenesulfonic acid in 200 ml. of acetone for 2 hours at 25°. Add aqueous sodium bicarbonate solution, extract the product with ether and purify it by chromatography on deactivated alumina. Elute with mixtures of hexane-benzene, pure benzene and mixtures of benzene-ether to obtain the title product.

EXAMPLE 35

17β-acetyl-13β-ethyl-17α-hydroxy-10β-methylgon-4-en-3-one

Treat an ice-cold solution of 3.8 g. of 13β,17-diethyl-10β-methylgon-4,17(20)-dien-3-one in 200 ml. of t-butyl alcohol containing 9.3 ml. of pyridine and 1.9 ml. of water with 3.8 g. of N-methylmorpholine oxide, 8.0 g. of phenyl iodosoacetate and 40 mg. of osmium tetroxide. Stir the slurry at 0° for 2 days, add a solution of 1.5 g. of sodium sulfite in 100 ml. of water and stir the mixture for 15 minutes. Filter, concentrate the filtrate, dilute with water and extract with chloroform. Wash the extract with water, dry, and evaporate. Chromatograph the residue on deactivated alumina and elute with benzene and benzene-ether mixtures to obtain the title product.

EXAMPLE 36

17α-acetoxy-17β-acetyl-13β-ethyl-10β-methylgon-4-en-3-one

Keep a solution of 1.0 g. of 17β-acetyl-13β-ethyl-17α-hydroxy - 10β - methylgon - 4 - en - 3 - one and 1.0 g. of p-toluenesulfonic acid in 50 ml. of acetic acid and 10 ml. of acetic anhydride for 16 hours at 25°. Dilute the mixture with ether, wash with water, dry and evaporate. Chromatograph the residue on deactivated alumina and elute with hexane-benzene, benzene, and benzene-ether mixtures to obtain the title product.

EXAMPLE 37

13β-ethyl-17β-hydroxy-10β-methylgon-4-en-3-on-17α-ylpropynoic acid

Add methylmagnesium bromide in tetrahyrofuran (6 ml. of 3 M) with stirring to a refluxing solution of 13β - ethyl - 3,3 - ethylenedioxy - 17α - ethynyl - 10β-methyl-17β-hydroxygon-5-ene (0.8 g.) in tetrahydrofuran (5 ml., previously distilled from methylmagnesium bromide). Reflux with stirring for 24 hr. under carbon dioxide maintained at a pressure slightly greater than atmospheric. Add the cooled mixture to an excess of ice-cold 0.4 N sulphuric acid and remove most of the solvents under reduced pressure. Extract the residue with ether and evaporate the washed and dried extracts. Chromatograph the residue on silica gel, elution with benzene, benzene-ethyl acetate mixtures, and pure ethyl acetate to obtain the title product.

EXAMPLE 38

3-(13β-ethyl-17β-hydroxy-10β-methylgon-4-en-3-on-17α-yl)propionic acid lactone

Shake a solution of 13β-ethyl-17β-hydroxy-10β-methylgon-4-en-4-on-17α-ylpropynoic acid (0.37 g.) in methanol (60 ml.) containing 2% palladised strontium carbonate (0.1 g.; prehydrogenated in situ) until two milliequivalents of hydrogen (ca. 45 ml.) are taken up. Add Celite, filter the suspension and evaporate the filtrate to obtain the title product.

EXAMPLE 39

3-(13β-ethyl-17β-hydroxy-10β-methylgona-4,6-dien-3-on-17α-yl)propionic acid lactone Reflux 3 - (13β - ethyl - 17β - hydroxy - 10β - methylgon-4-en-3-on-17α-yl)propionic acid lactone (0.5 g.) for 2 hr. in acetic anhydride (9 ml.)-acetyl chloride (3.5 ml.)-pyridine (0.35 ml.). Evaporate the solution under reduced pressure to obtain the crude 3-(3-acetoxy-13β-ethyl - 17β - hydroxy - 10β - methylgona - 3,5 - dien - 17α-yl)propionic acid lactone. Add N-bromosuccinimide (0.275 g.) portionwise with stirring to the foregoing acetoxylactone (0.55 g.) in acetone (47.3 ml.)-water (15 ml. at 0° containing pyridine (0.32 ml.), acetic acid (1.5 ml.) and sodium acetate (1.5 g.). Stir the mixture for 2 hr., add it to brine and extract with ether. Evaporate most of the ether at 15° under reduced pressure, then add calcium carbonate (1.65 g.) and dimethylformamide (38.5 ml.). Evaporate the remaining ether and reflux the mixture for a further 2 hr. Filter the cooled mixture, wash the filtered solids with ether, combine the filtrate and washings, and evaporate the washed and dried organic solution. Chromatograph the residue on acid-washed alumina, eluting with benzene and benzene-ether mixtures to obtain the title product.

EXAMPLE 40

3-(7α-acetylthio-13β-ethyl-17β-hydroxy-10β-methylgon-4-en-3-on-17α-yl)propionic acid lactone Reflux 3 - (13β - ethyl - 17β - hydroxy - 10β - methyl-gona-4,6-dien-17α-yl)propionic acid lactone (0.225 g.) in thioacetic acid (1 ml.) for 2 hr. Remove the excess acid under reduced pressure and chromatograph the residue on silica gel, eluting with benzene and benzene-ether mixtures to obtain the title product.

The subject matter which the applicants regard as their invention is particularly pointed out and distinctly claimed as follows:

1. A compound of the structure

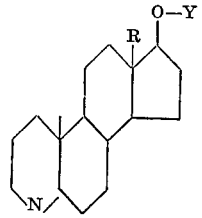

wherein

R is polycarbon alkyl,
Y is H, or lower alkyl carboxylic acid acyl,
Z is keto or cyclic ethylene ketal.
2. A compound of claim 1 wherein R is ethyl.
3. 13 - polycarbonalkyl - 5 - bromo - 17 - hydroxygonan-3-one acetate.

4. 13-ethyl-5-bromo-17-hydroxygonan-4-one acetate.
5. 13-polycarbonalkyl-17-hydroxygon-5(10)-en-4-one.
6. 13-ethyl-17-hydroxygon-5(10)-en-4-one.
7. 13 - polycarbonalkyl - 10 - cyano - 17 - hydroxygonan-4-one acetate.
8. 13 - ethyl - 10 - cyano - 17 - hydroxygonan - 4 - one acetate.
9. A process for preparing a 10-methyl-13-alkylgonan-4-one comprising:
 (a) converting a 13-alkylgon-4-ene to the corresponding 4-hydroxy-5-bromo derivative by adding HOBr at the 4-position,
 (b) oxidizing with a mild oxidant to a 4-keto-5-bromo derivative,
 (c) dehydrobrominating under mild acid or basic conditions across the 5(10) position to obtain the 4-keto-5(10)-ene derivative,
 (d) adding hydrocyanic acid across the 5(10) position to obtain the 4-keto-10-cyano derivatives,
 (e) ketalizing in the presence of acid to protect the 4-keto group,
 (f) reducing with a metallic hydride the 10-cyano group to the corresponding imine,
 (g) converting the imine group to a 10-methyl group by Wolf-Kishner reduction, and
 (h) hydrolyzing the protecting ketal group in the presence of acid.
10. The process of claim 9 wherein the 13-alkyl group is methyl.
11. The process of claim 9 wherein the 13-alkyl group is ethyl.

No references cited.

HENRY A. FRENCH, *Primary Examiner.*

U.S. Cl. X.R.

260—239.57, 397.2, 397.4, 397.5, 999